Figure 1:
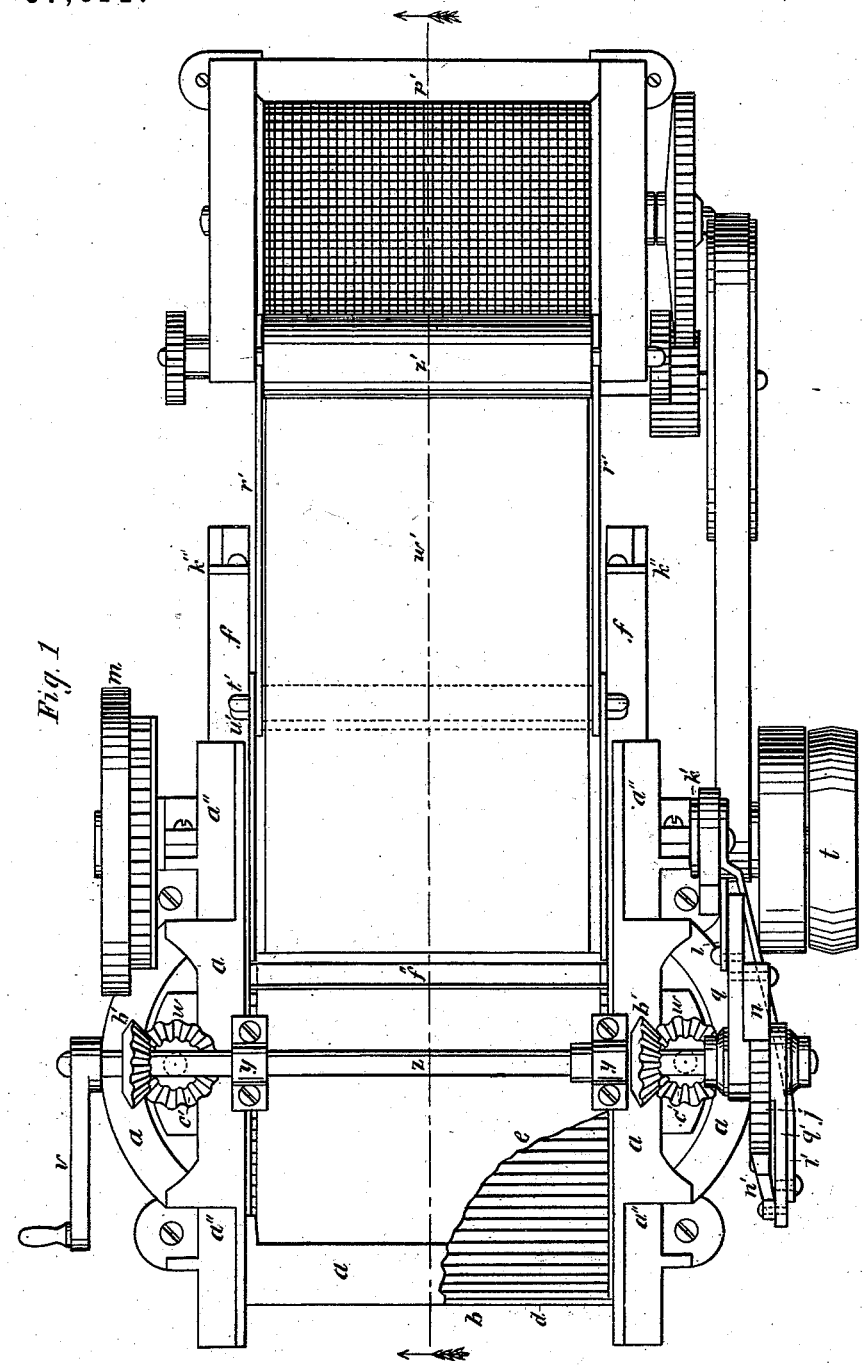

S. A. CLEMENS, dec'd.
A. H. CHETLAIN, Adm'r.
COTTON-PRESS.

No. 187,814. Patented Feb. 27, 1877.

3 Sheets—Sheet 2.
S. A. CLEMENS, dec'd.
A. H. CHETLAIN, Adm'r.
COTTON-PRESS.
No. 187,814. Patented Feb. 27, 1877.
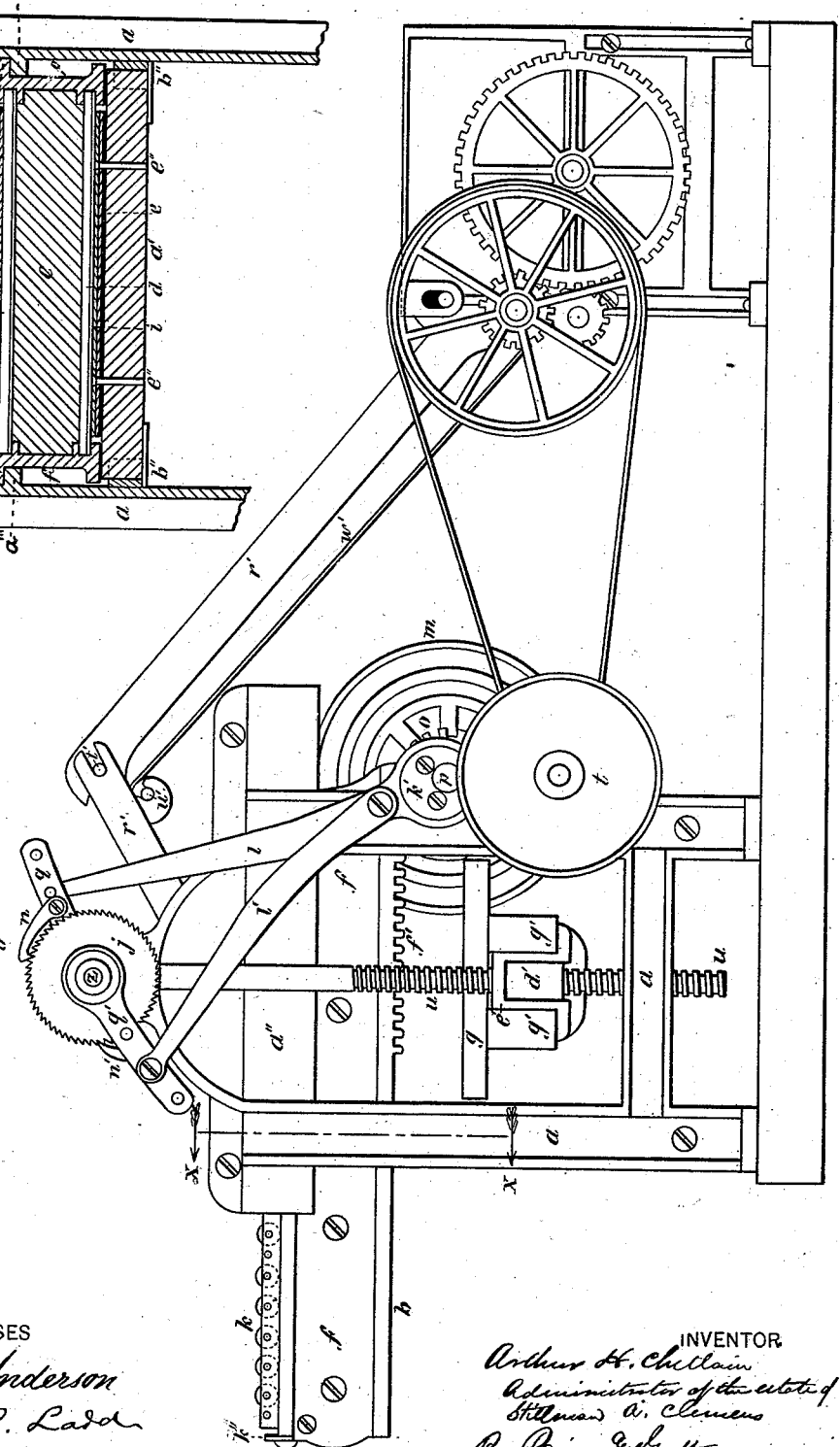
WITNESSES
Villette Anderson
Story B. Ladd
INVENTOR
Arthur H. Chetlain
Administrator of the estate of
Stillman A. Clemens
By Paine and Grafton ATTORNEYS
N. PETERS, PHOTO-LITHOGRAPHER, WASHINGTON, D. C.

3 Sheets—Sheet 3.
S. A. CLEMENS, dec'd.
A. H. CHETLAIN, Adm'r.
COTTON-PRESS.
No. 187,814. Patented Feb. 27, 1877.
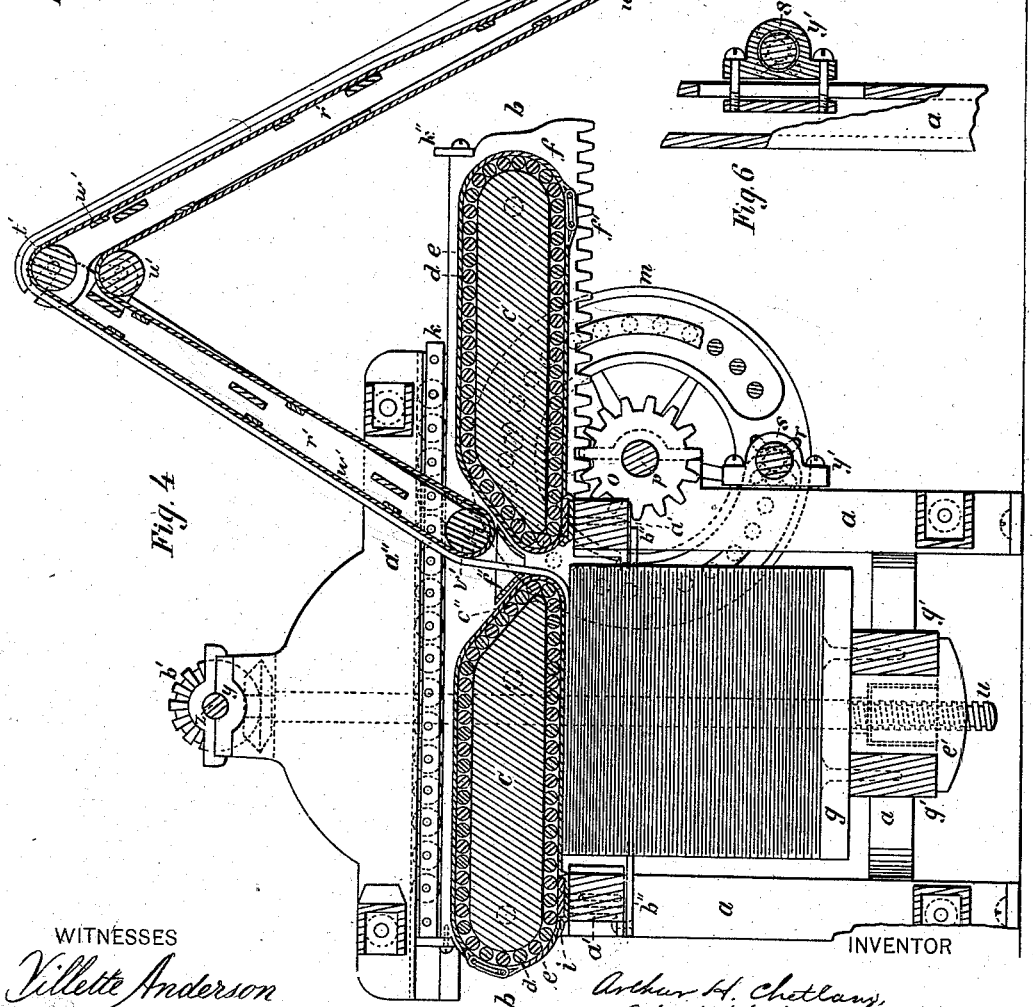
WITNESSES
Villette Anderson
Story B. Ladd.
INVENTOR
Arthur H. Chetlain,
Administrator of the estate of
Stillman A. Clemens.
By Paine & Grafton ATTORNEYS

UNITED STATES PATENT OFFICE.

ARTHUR H. CHETLAIN, OF CHICAGO, ILLINOIS, ADMINISTRATOR OF STILLMAN A. CLEMENS, DECEASED.

IMPROVEMENT IN COTTON-PRESSES.

Specification forming part of Letters Patent No. 187,814, dated February 27, 1877; application filed December 19, 1876.

*To all whom it may concern:*

Be it known that STILLMAN A. CLEMENS, deceased, late of Chicago, in the county of Cook and State of Illinois, did invent certain new and useful Improvements in Cotton-Presses, of which the following is a full, clear, and exact description thereof, which will enable others skilled in the art to which it appertains to make and use the same, reference being had to the accompanying drawings, and to letters of reference marked thereon, which form a part of this specification.

The object of the invention is to provide a machine that will bale cotton by a continuous automatic action in direct connection with the process of ginning it.

Cotton, which in a loose state is very bulky, should be compressed in small quantities in order to condense it as much as possible, and to obtain the maximum density each increment to the volume of the cotton should be compressed at the time it is added to the bale. This improved cotton-press packs the cotton in this manner, and at the same time in such a way that it can afterward be used from the bale to the best advantage.

The cotton, as it comes from the gin, is formed into a continuous sheet, which is pressed and laid under pressure in folds doubled one upon the other. The bale is thus formed of continuous parallel layers of cotton greatly condensed.

I do not in these Letters Patent claim the method of forming a bale of cotton from a continuous sheet folded back and forth in layers, or the form of the bale. Those are made the subjects of another application for Letters Patent. But I now claim the means for thus folding and packing a bale of cotton.

The invention consists of the cotton-press devised and constructed to accomplish this object, comprising mechanism for forming the loose cotton as it comes from the gin into a sheet; for conveying the sheet to the baling-bed and depositing it, under pressure, in layers doubled back and forth, one upon another; in devices for avoiding frictional resistance; for retaining the compressed layers as they accumulate in the formation of the bale; for slowly lowering the bale as formed so that new layers may be deposited, and for passing the bagging and ties around the bale.

The accompanying drawings show the construction of the press and all the details connected therewith. They are made on three sheets, and the same letters of reference indicate like parts.

Figure 1 on Sheet 1 is a plan of the whole machine, with part of the frame and one of the aprons broken away to show the rollers underlying the apron. Fig. 2 on Sheet 2 is a side elevation of the machine; and Fig. 3 shows a cross-section on the line X X of Fig. 2, through the frame of the press and the traversing table $b$. Fig. 4 on Sheet 3 is a longitudinal section on the line of section shown on Fig. 1, through the center of the whole machine; and Figs. 5 and 6 show details connected with the mangle-wheel, and the journal of the shaft of the mangle-pinion.

$a$ is the frame of the press. $b$ is a traversing table, formed of two iron girders, $f f$, connected by two platens, $c\ c$. The ends of the platens $c\ c$ rest in flanged recesses in the girders $f f$, and are firmly bolted to them. To insure the proper strength and rigidity the platens may be cast with the girders, all in one piece. Around each platen is a continuous row of rollers, $d$, of hard wood, metal, or other material, of small diameter, the ends of which rest in grooves $f''$ in the girders $f$.

Encircling the rollers $d$ of each platen is a canvas sheet, $e$, which is stretched very tight and properly laced or fastened. Instead of canvas, leather or thin sheet metal, or other material of suitable flexible quality, may be used.

To lessen the friction of the rollers $d$ about the platens $c\ c$, a large roller may be inserted at the inside edge $c''$ of the platens, about which the small rollers $d$ will roll.

A loop or fold extends across each apron, through which passes a bar, $i$, with pins $e''$, which extend downward through the apron $e$ into sockets in the cross-bars $a'$. The bars $i$ may project beyond the aprons at the sides, and, passing under the girders $f f$, may be fastened directly to the frame $a$ of the press. Any equivalent device may be used to fasten the apron to the frame of the press.

The aprons $e\ e$ are thus attached to the fixed parts of the press, so that when the traversing table, with its platens, moves to and fro, the aprons pass back and forth around the platens, and are alternately brought in contact with the whole upper surface of the bale of cotton under the pressure of the rollers $d$, an additional layer or sheet of cotton being deposited upon the bale under pressure with each forward movement of each platen. But, in respect to the bale of cotton, the aprons have no sliding horizontal motion, and therefore do not by friction displace the layers of cotton, but, on the contrary, prevent any such displacement by the horizontal movements of the rollers $d$.

On the upper sides of the girders $f\ f$ are sets of connected anti-friction rollers $k\ k$, which, when the traversing table is pressed upward in forming a bale, run in grooves on the under sides of the beams $a''$. These beams are shown as if they were part of the iron casting forming the frame of the press. But if the frame of the press is made of wood, then iron ways for the rollers $k\ k$ may be inserted in the beams $a''$. The frames connecting the rollers are not fastened in any way to the girders $f\ f$; but stops $k''$ at the ends of the girders keep them in place. The girders have lateral projections $f'''$, which rest and slide upon ledges $a'''$ on the frame of the press.

When a bale is in the press the resultant pressure is upward against the beams $a''$, and the resistance to the horizontal movement of the traversing table is diminished by the anti-friction rollers $k\ k$.

Reciprocating motion is given the table by two toothed racks, $f'\ f'$, on the lower edges of the girders $f\ f$, which are driven by two pinions, $o$, on a shaft, $p$.

To one end of the shaft $p$ is attached a mangle-wheel, $m$, made to turn alternately backward and forward by the mangle-pinion $r$ on the vibrating end of the shaft $s$, which, at the opposite end, carries a driving-pulley, $t$. The mangle-wheel is constructed as shown by Fig. 5. The end of the vibrating shaft $p$, carrying the mangle-pinion $r$, rests in a groove in the face of the mangle-wheel, which groove incloses the series of trundles, and keeps the latter in gear with the mangle-pinion $r$, and guides the mangle-pinion from the outside to the inside of the mangle-wheel, and vice versa. The ends of the trundles are braced and connected as shown.

The journal-box $y'$ of the vibrating shaft $s$, next to the pinion $r$, is bolted, through a vertical slot in the frame of the press, to a plate on the other side. This allows the pinion $r$ to vibrate as the motion changes. The other journal-box of the shaft $s$, next to the driving pulley $t$, is made with short horizontal slots for the bolts, so as to give the necessary play.

Underneath the traversing table $b$ is the baling-bed $g$, made with open spaces or grooves, for passing the bands through under the bale. The baling-bed $g$ is supported by two long screws, $u\ u$, the heads of which bear upon the lugs $w$.

Standard journal-boxes $y\ y$ support a horizontal shaft, $z$, in the plane of the screws $u$. At one end of this shaft is a hand-crank, $v$, and fastened to the shaft are two beveled wheels, $b'\ b'$, which gear into like wheels $c'\ c'$ on the upper ends of the screws $u\ u$, so that the screws are turned in unison by the wheels $b'\ b'$. At the lower ends of the screws $u\ u$ are the screw-nuts $d'$, bearing under the stirrups $e'$, which support the ends of the bed-sills $g'\ g'$, on which rests the baling-bed $g$. The screws $u\ u$ are made double-threaded, so as to unscrew easily under pressure.

The traversing table $b$, in its successive movements, carries the inner edges $c''$ of the two platens, successively, equal distances beyond the vertical plane of the centers of the screws $u$, so as to deposit half of each layer of cotton on either side of that plane, and balance the pressure of the cotton on the baling-bed.

To operate the screws automatically a ratchet-wheel, $j$, is attached to one end of the shaft $z$, opposite the hand-crank $v$. Working on the shaft $p$ is an eccentric, $k'$, which operates, by means of the arms $l\ l'$ and $q\ q'$, the thrusting and pulling pawls $n\ n'$ on opposite sides of the ratchet-wheel $j$. The arm $l$, working the pulling-pawl $n$, is attached directly to the eccentric $k'$, and the end of the arm $l'$ is pivoted on the arm $l$. The arms $q\ q'$ turn on the shaft $z$ on opposite sides of the ratchet-wheel $j$, and the arms $l\ l'$ are attached to them by screw-bolts, which may be set at any distance from the shaft $z$, and an adjustable feed-motion may thus be given to the screws $u\ u$, and, through them, to the baling-bed $g$. The arms $q\ q'$ carry, respectively, the pawls $n\ n'$. The upper one, $n$, (the pulling-pawl,) rests, by its weight, on the ratchet-wheel $j$, and the lower one, $n'$, (the pushing-pawl,) is held in its place by a spring, and both can be thrown back from the wheel, if desired.

To convey the sheet of cotton to the press, a jointed apron-frame, $r'$, supports the journaled rollers $s'$, $t'$, $u'$, and $v'$, over which runs the endless apron $w'$.

The roller $s'$ is attached next to the wire cylinder $p'$, on which the loose fibers of cotton are received as they are blown from the gin. The roller $s'$ and the wire cylinder $p'$ are driven by suitable gearing, and so adjusted that the surface of the cylinder $p'$, the apron $w'$, and the traversing table $b$ shall each travel the same linear distance in the same time, and the sheet of cotton formed on the cylinder $p'$ shall not be stretched or gathered in folds on its passage from the cylinder $p'$ to the apron $w'$, or in its transfer from the apron $w'$ to the upper surface of the bale. The cylinder $p'$ is driven by a belt from the shaft $s$. A roller, $z'$, is placed just above the roller $s'$, and geared with it, and the cotton coming from the cylinder passes between them.

The roller $v'$ is attached to the traversing table $b$, so as to deliver the sheet of cotton into the hopper $f''$, placed between and above the platens $c$, and extending across the whole distance between the girders $f f$, to guide the sheet of cotton as it leaves the apron $w'$, and prevent it from coming in contact with the aprons $e$ around the platens, which turn in opposite directions, and would displace the cotton, until it has passed underneath the advancing platen.

When, by the reciprocating revolutions of the mangle-wheel shaft $p$, the table $b$ moves horizontally to and fro, it carries the attached end of the apron-frame $r'$ with it, the two sections of the frame opening and closing on the hinge-joint which they form with the journal-axis of the roller $t'$, thus allowing the apron $w'$ to adjust itself, without change of tension, to the movements of the table, and to steadily carry the sheet of cotton from the wire cylinder $p'$ to the hopper $f''$.

$a$ $a'$ are two removable bars, between which the bale is formed, the distance between them being made equal to the horizontal motion of the traversing table. Their ends are inserted from the under side into sockets in the frame of the press, and the plates $b''$, each being hinged at one end, are turned under the bars $a'$ and support them. The aprons $e$ are fastened to these bars $a'$, as described, to prevent any horizontal sliding motion of the aprons over the top of the bale.

To operate the press, the baling-cloth is spread on the baling-bed $g$, and the pawls $n$ $n'$ being thrown back from the ratchet-wheel $j$, the baling-bed is run up by turning the hand-crank $v$ until the baling-bed, passing between the bars $a'$, stops against the aprons $e$ of the traversing table. The machine is so placed in respect to the gin that the cotton is blown from the gin toward the press, and against the outside of the wire cylinder $p'$. A canvas screen is placed above the cylinder, so as to deflect the cotton downward upon the cylinder, and prevent the cotton and the dust from being blown over the cylinder upon the apron $w'$. The dust that still remains with the cotton is blown through the cylinder and falls to the ground, leaving the cotton a mat on the outside. The sheet of cotton is carried round and transferred to the feed-apron $w'$, passing between the rollers $s'$ and $z'$, which compress and condense it, to the hopper $f''$. The end of the sheet passing through the hopper $f''$ rests on the baling-bed $g$, and the traversing table, with the friction-rollers $d$, rolling on the apron of the advancing platen, comes upon the sheet of cotton, pressing it down as it is laid across the bed. Upon the return movement of the table, the sheet of cotton is folded back by the other platen and spread evenly and pressed, forming a second condensed layer upon the first. The screws slowly released by the feed mechanism allow the bed to descend to admit more cotton, which is kept compacted between the bed and table, so as to restrain and limit the direct resistance of its elasticity to the movements of the table. The layers are thus deposited one upon another until the bale is completed.

The condensing pressure results from the accumulation of the layers of cotton as the bale is formed, and the feed mechanism can be so adjusted, by means of the rods $l$ $l'$ and arms $q$ $q'$, that the cotton may be of any required density within the limits determined by the strength of the press or the power used.

A bale thus formed, when opened for use, can be drawn out in one continuous sheet, a form easily handled and well adapted to facilitate the processes through which it must subsequently pass.

All the movements under pressure are on anti-friction rollers above and below the table, and the machine, having been first correctly adjusted, its operation is automatic.

To tie or hoop the bale, remove the bar $a'$ on the side to which the last traverse movement was made, pass the ties through the slots in the baling-bed, and, together with the bagging, up between the platens through the hopper $f''$. Then traverse the table across to the other side, remove the other bar $a'$, draw down the bagging and ties, and secure their ends, as usual. Then turn down the screws by the hand-crank and remove the bale.

The bale does not require to be confined at the sides when in the press. As it is formed from a sheet it has very little tendency to bulge or spread, and it has not been found necessary to confine the sides of the bale.

What I claim as the invention of STILLMAN A. CLEMENS, and desire to secure by Letters Patent, is—

1. The traversing table $b$, when combined with a cotton-press, for the purpose of laying and packing the cotton in folds under pressure, substantially as herein described.

2. The combination of the platens $c$ and girders $f$, when constructed substantially as described, for the purpose of keeping in place the layers of compressed cotton.

3. The platen $c$, rollers $d$, and endless apron $e$, when combined with the traversing table $b$, substantially as described, and for the purposes set forth.

4. The hopper $f''$, when attached to and in combination with the traversing table $b$, substantially as described, for the purpose of guiding the sheet of cotton, and preventing it from being displaced by the aprons $e$.

5. The anti-friction rollers $k$, constructed in sets, detached from the rest of the press, in combination with the frame of the press and the traversing table $b$, substantially as described, and for the purposes set forth.

6. The combination of the baling-bed $g$ with the screws $u$, having a continuous automatic motion, and gradually lowering the baling-bed as the bale is formed.

7. The combination of the mangle-wheel $m$, shaft $p$, pinions $o$, and traversing table $b$ with toothed racks $f'$, for the purpose of baling cotton, in the manner herein described.

8. The combination of an adjustable feed mechanism, consisting of the ratchet-wheel $j$, arms $q\ q'$ and $l\ l'$, and eccentric $k'$, constructed substantially as described, with the feed-screws $u$ and baling-bed $g$, substantially as described, and for the purposes set forth.

9. The combination of the hinged apron-frame $r'$ and apron $w'$ with the traversing table $b$ and cylinder $p'$, constructed substantially as described, and for the purposes set forth.

10. The combination of the cylinder $p'$, rollers $z'$ and $s'$, and apron $w'$, when combined with a cotton-press, for the purpose of forming the cotton into a sheet and carrying it to the press, substantially as described.

11. The traversing table $b$, constructed with the opening between the platens $c$, in combination with the cross-bars $a'$, for the purpose of passing the bagging and ties around the bale, substantially in the manner described.

12. The combination of the cylinder $p'$, the hinged apron-frame $r'$, the apron $w'$, the traversing table $b$, the feed mechanism, as described, the feed-screws $u$, the baling-bed $g$, the mangle-wheel $m$, pinion $r$, and vibrating shaft $s$, substantially as and for the purposes described.

In testimony that I claim the foregoing as the invention of STILLMAN A. CLEMENS, deceased, I affix my signature in presence of two witnesses.

ARTHUR H. CHETLAIN,
*Administrator of the Estate of Stillman A. Clemens, deceased.*

Witnesses:
S. S. GREGORY,
A. C. WICKER.